United States Patent

Weijman-Hane

[15] 3,706,384
[45] Dec. 19, 1972

[54] DEVICE FOR SEDIMENTATION OF PARTICLES FROM LIQUID

[72] Inventor: Gunnar Weijman-Hane, Vikingbergsvagen 4, Malmo, Sweden

[22] Filed: Aug. 6, 1970

[21] Appl. No.: 61,627

[30] Foreign Application Priority Data

Aug. 8, 1969 Sweden.....................11111/69

[52] U.S. Cl..................................210/519, 210/522
[51] Int. Cl. ................................................B01d 21/00
[58] Field of Search..............210/521, 522, 519, 532

[56] References Cited

UNITED STATES PATENTS

| | | | |
|---|---|---|---|
| 2,868,384 | 11/1959 | Puddington | 210/521 |
| 3,563,389 | 2/1971 | Mizrahi et al. | 210/521 |

FOREIGN PATENTS OR APPLICATIONS

| | | | |
|---|---|---|---|
| 907 | 1/1886 | Great Britain | 210/521 |

*Primary Examiner*—Reuben Friedman
*Assistant Examiner*—Frederick F. Calvetti
*Attorney*—Holman & Stern

[57] ABSTRACT

A device for sedimentation of particles from a liquid in which several plate-formed lamellae are arranged in and inclined at an angle in relation to the tank. The tank on both sides of said lamellae is provided with compartments which are separated by an inclined partition wall in a fluid-proof manner into two elongated partitions. (Through the lower of those partitions the liquid which is to be purified is supplied to the device and is fed through inlet openings at the lowermost edge). The lower of these partitions is provided with inlet openings to the lamellae space, whereby the upper edge of the tank is provided with a overflow to each of the upper partitions which has outlet openings for the purified liquid. The lowermost part of the tank is a funnel-shaped hopper having a sludge outlet.

7 Claims, 7 Drawing Figures

DEVICE FOR SEDIMENTATION OF PARTICLES FROM LIQUID

BACKGROUND OF THE INVENTION

The present invention relates to a device for sedimentation of particles from a liquid, comprising a tank for the liquid a plurality of parallel plate formed lamellae which are so arranged in the tank that they are inclined against the vertical plane and extend between two opposite side walls of the tank, means for supply of liquid to the lower side of cells which are formed by the lamellae, means for carrying away the liquid leaving the upper part of the cells and a sludge hopper located below the lamellae for collecting the settled sludge.

SUMMARY OF THE INVENTION

There are several earlier known several different types of sedimentation devices in the form of basins having inclined plates or so called lamellae. In such a known apparatus (Swedish Pat. No. 199 310), a suspension is supplied to the upper part of the sedimentation basin and the direction of flow thus takes place from the upper side downwards and then again upwards. The liquid flows around the pack of lamellae and passes through inlet openings between the lamellae, whereas the settled sludge is drained through separate outlet openings. As the surface of the settled sludge is on the same or a somewhat lower level than the outlet opening, the liquid flow and the flow of sludge may intersect each other which means that the sludge particles are whirled up which will result in a reduced sedimentation effect.

A construction (German Pat. No. 969 293) has also been suggested in which the sedimentation shall take place in a number of inclined tubes in which each slide plane is formed by a part-cylindrical portion and the cross section of a surface on the sludge deposit is formed as a segment of a circle. In relation to the total volume of this sedimentation plant, the sedimentation surface of the tube-formed lamellae is considerably smaller as compared to such plants which comprises inclined plain or corrugated plates. In this device, the lower part of the tubes is provided with a fixed partition wall which serves to separate the entering suspension from the outlet of sludge. The partition walls are arranged at right angles to the tubes which means that the inclination angle of the tubes cannot exceed 45° as the sludge outlet in other case would be obstructed. According to another known construction (French Pat. No. 098 155), the lamellae are formed of perforated corrugated plates or by narrow bars which eventually are bent in cross-section and which are arranged at such a distance from each other that a slot is formed between them. With this type of lamellae it is impossible to obtain a laminar flow of liquid whereby the premises necessary for sedimentation of very light particles, — such as flocculates, — are not fulfilled. The flow in this plant moreover is substantially horizontal.

The purpose of the present invention is to increase the capacity of sedimentation at a maintained high rate of sedimentation and an unchanged or even lower volume as compared to earlier known lamellae sedimentation apparatuses. As a comparison it can be mentioned that a conventional sedimentation plant may purify about 15 – 3 m³/ hour and m³ free water area above the lamellae whereas with a device according to the invention it has been possible to purify 20 – 40 cm³/hour and m³ free water area.

In order to obtain this very good result, it is of a vital importance that the liquid flow and the sludge flow do not intersect each other, that the flow of liquid is distributed as even as possible over the surface of the lamella and that the liquid flow within the different lamella cells may be guided. According to the invention, this is obtained in that the means for the liquid supply to the cells are formed of distributing boxes which are arranged outside the side walls and which distributing boxes are provided with inlet openings which communicate with the cells and are located close to the lower part of each lamella at the side of the lamella which forms an acute angle with the horizontal plane, that inlet openings associated with the same cell are located at the same level in such a way that a substantial portion of the energy capacity of the liquid flows from the opposite openings in one lamellae is exhausted when the flows are united, and that means for discharge of liquid are arranged in the upper part of the side walls of the lamella cells.

DESCRIPTION OF THE PREFERRED EMBODIMENT

Figure 1:
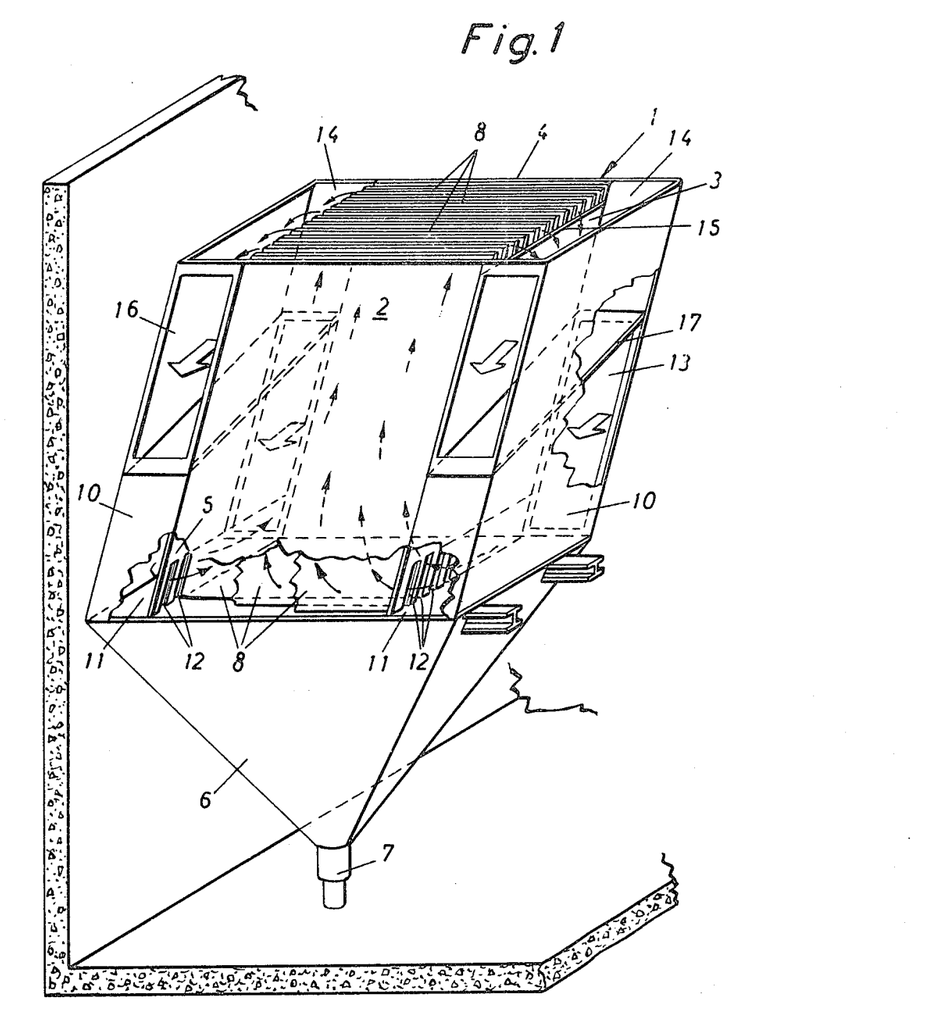
FIG. 1 shows a sedimentation apparatus, according to the invention, in perspective.
Figure 2:
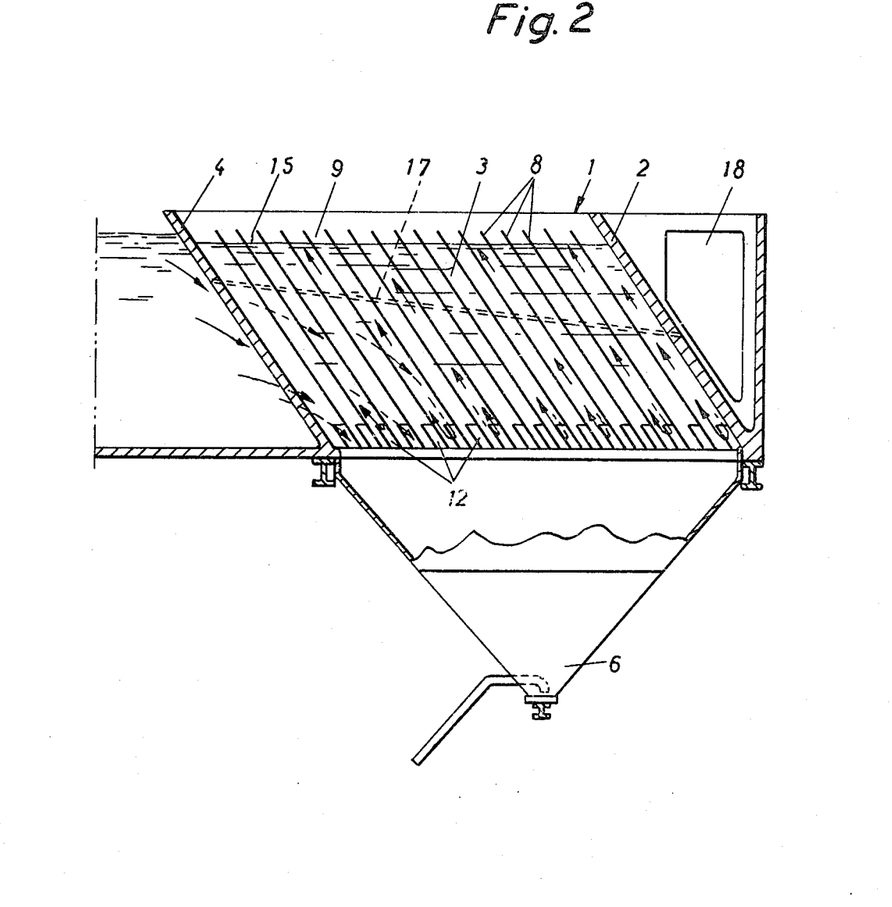
FIG. 2 shows a longitudinal section through the sedimentation apparatus according to FIG. 1.

The sedimentation apparatus according to the invention comprises a box-shaped tank 1 consisting of four side walls 2, 3, 4 and 5, which in the lower portions terminate in a funnel-shaped sludge hopper 6 having a sludge discharging device in the form of a valve 7 or the like. In the tank there are arranged a number of inclined plate-formed lamellae 8 which form an angle with the horizontal plane which angle must not be lower than 50°C at flocculated sludge. The lamellae are joined at the vertical side walls 3 and 5 in such a manner that no liquid of noteworthy amount can pass from one lamellae cell 9 to the adjoining cells.

On the outside of each of the side walls 3 and 5 there is arranged one distributing box 10, with bottom 11 thereof being arranged at a level with the lower edge of the lamella 8. The distributing boxes 10 communicate with the lamella cells 9 via a number of inlet openings 12 which are located close to the lower part of each lamella 8 and arranged in connection to the side of the lamella which forms an acute angle with the horizontal plane. The inlet openings 12 only take up a part of the total area between two lamellae.

The velocity of the liquid flow in the distributing boxes 10 is substantially equal directly opposite each other at one lamella so that the liquid flow through two opposing inlet openings 12 is substantially equal and a substantial amount of the energy contained in the liquid-flow is exhausted when the flows meet in the center of the lamella.

The distributing boxes 10 have a height of about half of the lamella height and in connection to and above each distributing box, there is arranged a collecting duct 14 which extends along the entire breadth of the tank 1. An outlet opening 16 of the collecting ducts 14 is located at the side of the tank 1 which is opposite to that where inlet 13 for the sedimentation liquid is located. The boxes 10 and the duct 14 form together a compartment having a constant cross-section and extending along the side walls 3 and 5. Hence the box and the duct is separated by an inclined roof 17 and bottom 17, respectively. The ducts obtain a suitable design in relation to the reduction and increase respectively of the liquid flow in the longitudinal direction. The side walls 3 and 5 have a somewhat lower height than the side walls 2 and 4 and the collecting ducts 14 which are connected to the side walls. An upper edge 15 of the side walls 3 and 5 which thus is situated at a lower level than the upper edge of the lamella forms an overfall or an overflow against the associated collecting duct 14.

Figure 3:
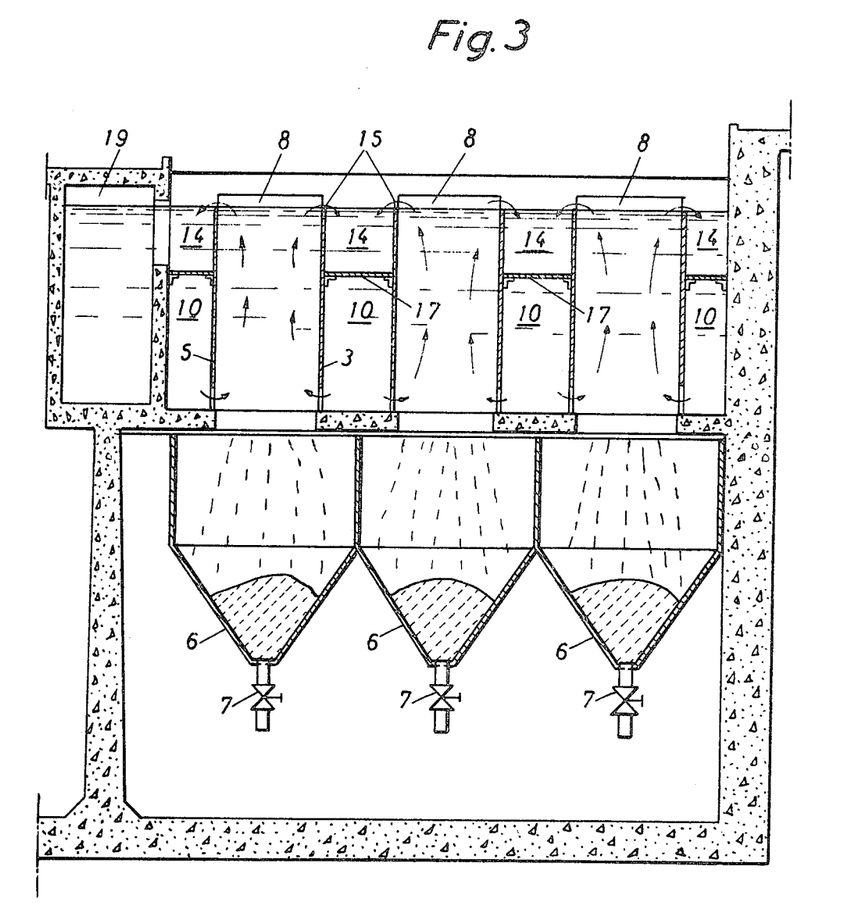
FIG. 3 shows a section through a sedimentation plant comprising a plurality of sedimentation apparatuses according to FIGS. 1 and 2.

FIG. 3 shows a sedimentation plant comprising a plurality of integrated units connected in parallel in which two adjoining sedimentation apparatus may have the same distributing boxes 10 and collecting ducts 14. The collecting ducts 14 may be connected to an interconnector 18 on the front of the tank, which interconnector carries the purified liquid to a transport duct 19. The sedimentation apparatuses are designed in a suitable module system which is adapted to industrial manufacture. The outer parts of the apparatus may be made of sheet metal of a strength sufficient to withstand the internal water pressure. The inner parts of the apparatus may be made by sheet metal, plastics or the like materials having a surface structure giving a low resistance against sliding. The apparatus also may be built in into a concrete tank whereby its outer parts not necessarily must be dimensioned in relation to the internal water pressure. The sludge hopper is formed by the concrete construction and the lamella plates with inlet and outlet ducts are mounted using the boxes as structural constructions. The sludge hopper may be the same for a number of sedimentation units.

The draining of the sludge from the sludge hopper 16 can take place continuously or intermittently and preferably automatically through time control or indicated sludge level.

The function of the device according to FIGS. 1 to 3 will now be described. The fact that the inlet openings 12 are located in connection to that side of the lamella, which forms an acute angle with the horizontal plane will lead to the infeed of liquid due to density relations will follow said side of the lamella. Therefore, this flow will not intersect the sludge flow which, due to larger density, will tend to follow the side of the lamella which forms an obtuse angle with the horizontal plane. If the liquid flow intersects the sludge flow, this will namely lead to the sludge which has already been settled, once more will be suspended in the liquid flow. At the counter flow principle, i.e., when the liquid flows upwards very stable flow is obtained, at the same time as a laminar flow is secured.

The fact that the liquid flows enter each lamella on the same level, they are directed against each other and at right angles to the liquid upflow and the exit of liquid takes place at the upper side walls of the lamella cells will together contribute to an even distribution of liquid over the largest portion of the lamella without the need of complicated distributing means.

Figure 4:
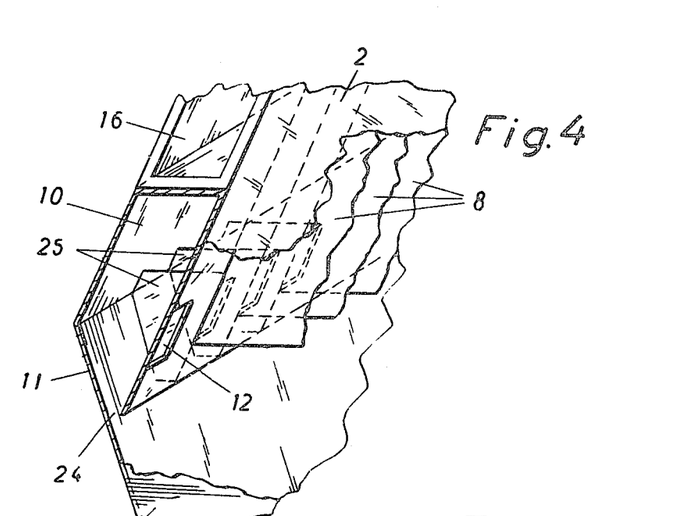
FIG. 4 illustrates in perspective a part of one side of the sedimentation apparatus according to an alternative design of the distributing boxes to be used at particle-rich suspensions.

The embodiment of the sedimentation apparatus shown in FIG. 4 differs from the apparatus described above in that on the outside of the side walls 3 and 5 of the tank 1, there are arranged one distributing box 10 each, the bottom 11 of which slopes against the lower edge of the side walls 3 and 5 where it is connected thereto, so that sludge which has settled in the distribution boxes may slide down to a sludge hopper 6 below.

In particle-rich suspensions, where a great deal of the sludge particles have a high settling velocity, a considerable primary sedimentation may take place already in the distributing boxes. In this case, the sloping bottoms 11a of the distributing boxes are not connected to the side walls but extend below these so that a slot 24 is formed therebetween and the sludge which has settled in the distributing boxes may flow off to the sludge hopper outside the lamella cells. The lamellae 8a in this case do not extend down to the lower edge of the side walls 3 and 5. The horizontal liquid flow in the distributing boxes is limited to the space above the inlet openings 12 by side lamellae 25 which are entirely detached but form an elongation of the lamellae 8.

The distributing boxes 10 communicate with the lamella cells 9 via a number of inlet openings 12 located near the lower part of each lamella 8 and arranged in connection to the side of the lamella which forms an acute angle with the horizontal plane. The inlet openings 12 take up a larger or smaller part of the total breadth between two lamellae, depending on the concentration of particles in the liquid flow.

Figure 5:
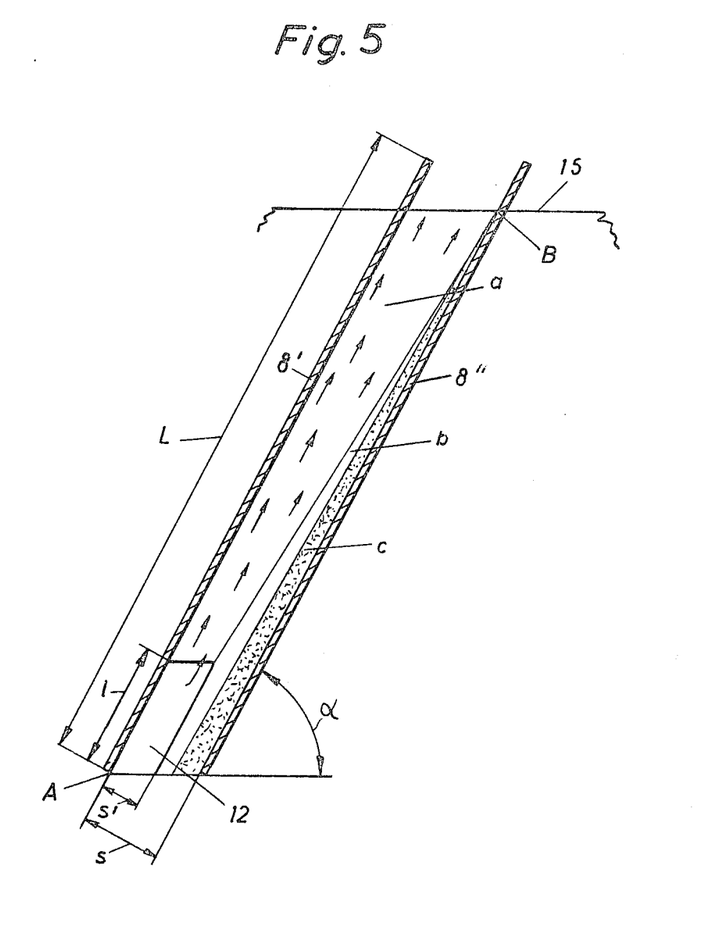
FIG. 5 shows on a larger scale a cross section through two lamellae and the associated inlet openings.

The physical course according to the present invention is characterized, FIG. 5, by an upwards moving liquid flow $a$ which follows the back-side of the lamella $8'$, a settled sludge flow $c$ which follows the frontside of the lamella $8''$ and there between liquid flow $b$ which moves downward.

At liquid flows having a low particle concentration for instance at chemical sedimentation of surface water or secondary sedimentation of biologically purified surface water, it can be presumed as a good approximation that the particle supporting liquid flow will fill all of the lamella cells and have a mean velocity $V_v$ $$V_v = q/S \cdot \sin\alpha$$

where $q$ is the liquid amount passing each lamella cell per unit of time.

In the above equation as in the equations following hereinafter the breadth of the lamella B has been set = 1m. This transporting liquid flow has the vertical component.

$$V_{vv} = V_v \cdot \sin\alpha = q/s$$

and the horizontal component $$V_{vx} = V_v \cos \alpha = q \cos\alpha / s \sin\alpha$$

When the particle which is transported has a settling velocity $V_f$ which is caused by gravity, the resulting settling velocity vertically will be $\overline{V_{vu}}$ $$\overline{V_{vu}} = q/s - V_f$$

If Hazen's surface load theory is applied on a particle having the above velocity components this must have been transported the horizontal way A–B in the same or shorter time than its transportation the vertical way A–B$_1$ if the particle shall be separated to 100 percent. This condition will lead to the following connecting equation $$Y_a/V_f \leq L/S \cos \alpha + 1$$

Where $Y_a = q/s$ is the fload load on the free water surface of the lamella cell. This equation indicates that the relative area load $Y_a/V_s$ will increase directly in proportion to the length of the lamella $L$ and in inverse proportion to the distance between the lamellae $S$. To a given lamella length thus a unlimited increase of the relative area load could be made by reducing the lamella distance. The surface load theory, however, presumes a laminar flow. The influence of the lamella distance on the relative area load thus must be connected to a premise which guarantees a laminar flow as given by Reynolds number R.

The type of flow generally varies from laminar to turbulent flow at R ≥ 500. Tests have shown that for water containing aluminum-hydroxide-flocculus, the type of flow will vary at R ≥ 350. Most conventional sedimentation basins having a horizontal flow work at a Reynold number of 1.000 – 25.000. In lamella sedimentation where it is not necessary to take the sediment deposit into account it is possible to work at very low Reynold's numbers which guarantee a laminar flow. From this the following relation is given:

$$300 \geq R \geq V_v \cdot \frac{H}{\gamma} = \frac{Y_a \cdot B \cdot S}{2 \cdot \gamma \cdot (B + S \sin \alpha)}$$

where $B$ is the lamella breadth, $H$ is the hydraulic mean depth and $\gamma$ is the kinematic viscosity of the water.

At very low values of $R$ the flow will be instable. A condition for a stable flow may be expressed by Froudes number $F$ which indicates a stable flow if $F$ is larger than $10^{-5}$. The following relation is given:

$$10^{-5} \leq F \leq \frac{V_v^2}{g \cdot H} = \frac{Y_a^2}{g \cdot \sin \alpha^3} \cdot \frac{2(B + S \sin \alpha)}{B \cdot S}$$

where $g$ is the acceleration due to gravity.

Figure 6:
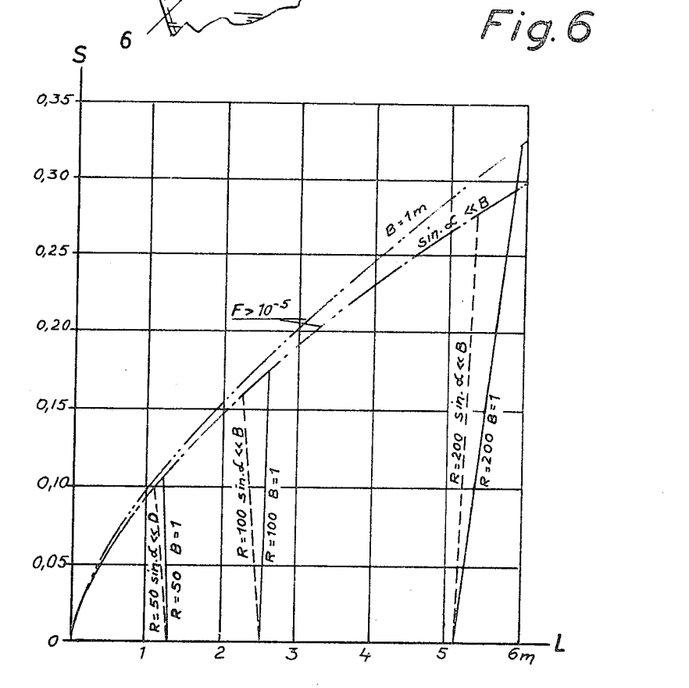
FIG. 6 shows diagrammatically the areas for stable and laminar flow for different values of $L$ and $S$, $V_f = 1,0$ m/h.

Using the above equations the area for a stable and laminar flow may be calculated at different values of the lamella length $L$ and the lamella distance $S$. In the diagram, FIG. 6, those areas have been calculated for a particle having a settling velocity $V_f = 1.0$ m/h. From the diagram it can be seen that there are several possibilities to chose the relation $L/S$ without jeopardizing the laminarity or the stability.

For particle-rich suspensions it is not possible to presume that the liquid lending section is all of the lamella breadth. Approximately it can be presumed that the section is equal to the breadth $S$ of the lamella cell which in its lower part is not taken up by sludge flow, i.e., $S'$ in FIG. 5. The following equation is thereby given.

$$Y_a/V_f \leq S'/S \cdot L/S (\cos \alpha + 1)$$ whereby the relation $S'/S$ may be estimated by aid of the continuity condition that the amount of sludge which is supplied through the liquid flow per unit of time shall be equal to the amount of sludge which is carried away by the sludge flow per unit of time. Thereby it is given $$S'/S = 1' - q/(S \cdot V_s) \cdot C_v/C_s$$

where $V_s$ is the sliding velocity of the sludge flow, $C_v$ the sludge concentration in the liquid flow, and $C_s$ is the sludge concentration in the sludge flow.

Figure 7:
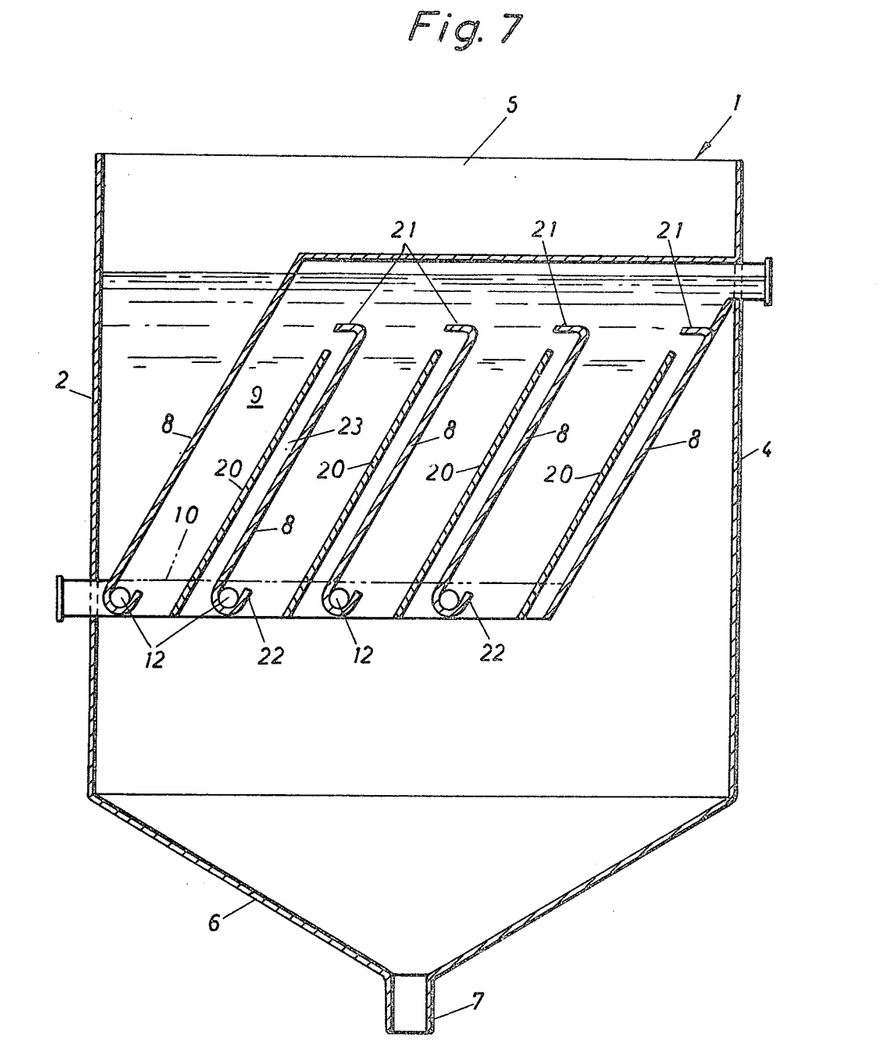
FIG. 7 shows a modification of FIG. 1.

Different constructional details of the device such as they have been shown and described in the foregoing are not limited to the examples given, but a plurality of modifications are possible within the idea of the invention. FIG. 7 shows a modification of FIG. 1.

I claim:

1. A device for sedimentation of particles from a liquid, comprising a tank defined by side walls, a plurality of plate-formed lamellae arranged in parallelism located in the tank, each lamella forming with a vertical plane, an acute angle and extending between two opposite side walls of the tank, distributing means arranged outside of the tank for supplying liquid to the lowermost side of cells defined between each two adjacent lamellae, means for the discharge of the treated liquid at the uppermost portion of the tank, means for carrying away the liquid leaving the tank, and a sludge hopper arranged below the tank for collecting the settled particles, the improvement being that two opposite side walls of the tank are defined by the distributing means and the carrying away means, said distributing means and carrying away means being constituted as boxes, each box constituting the carrying away means being located above each box constituting the distributing means, a common partition wall separating said boxes, each box constituting the distributing means having in its wall forming a tank side wall a plurality of large inlet openings, with the openings in one side wall being directly opposite the openings in the other side wall in each cell and in close contact with the lamellae sides defining an acute angle with the horizontal plane, and the discharge means being defined as overflow edges.

2. The device as claimed in claim 1 in which the inlet openings have a breadth equal to the difference between the lamellae distance and the largest expected thickness of the sludge flow at the lower edge of the lamella.

3. The device as claimed in claim 1 in which the bottom of each box constituting the distributing means is defined by the side wall of the sludge hopper, the latter side wall having an inclination in a direction against the lamellae thereby enabling the particles settling in the boxes defining the distributing means to slide down into the sludge hopper through a slot provided between the lower edge of the tank side wall and the side wall of the sludge hopper.

4. The device as claimed in claim 3 in which the boxes constituting the distributing means are provided with side lamellae located in alignment with the lamellae in the tank, with said side lamellae limiting the horizontal flow of liquid in the boxes constituting the distributing means to the area above the inlet openings.

5. The device as claimed in claim 4 in which the side lamellae are inclined in correspondence with the lamellae in the tank and have a height substantially equal to the height of the inlet openings.

6. The device as claimed in claim 1 in which the common partition wall is inclined in the longitudinal direction thereby giving the boxes constituting the distributing means a reduced area in the direction of flow and the boxes constituting the carrying away means an increased area in the same direction.

7. The device as claimed in claim 1 in which a plurality of sedimentation units are connected in parallel whereby each two adjoining units have a common intermediate box constituting the distributing means and a box constituting the carrying away means.

* * * * *